Figure 7:
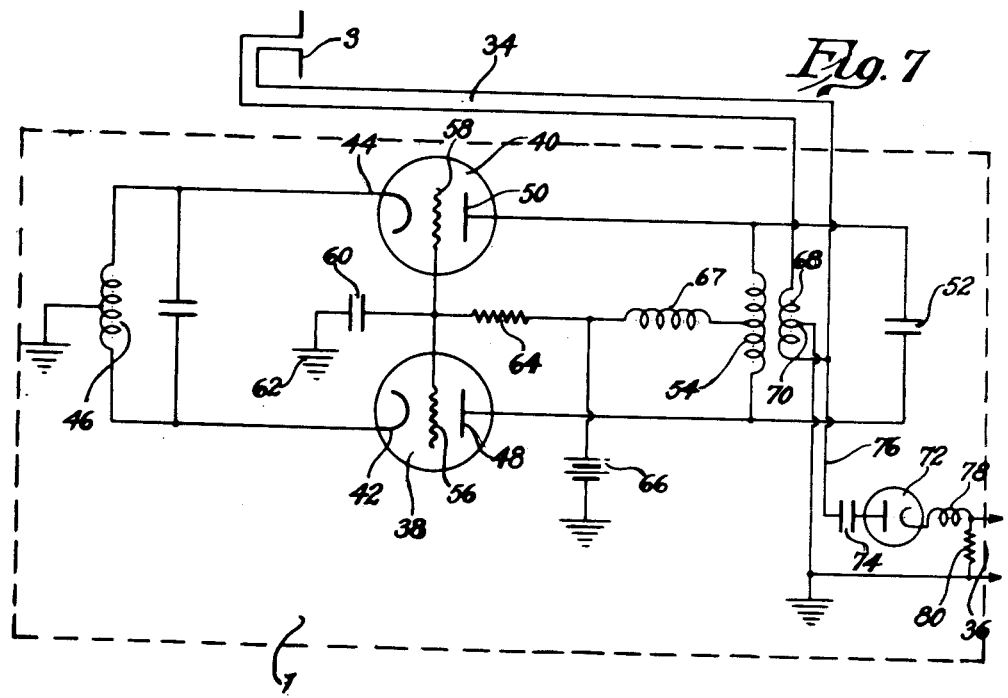

Jan. 6, 1953        R. H. RINES        2,624,874
ELECTRICAL APPARATUS FOR SOLVING RIGHT TRIANGLES
Filed Sept. 4, 1944        2 SHEETS—SHEET 1
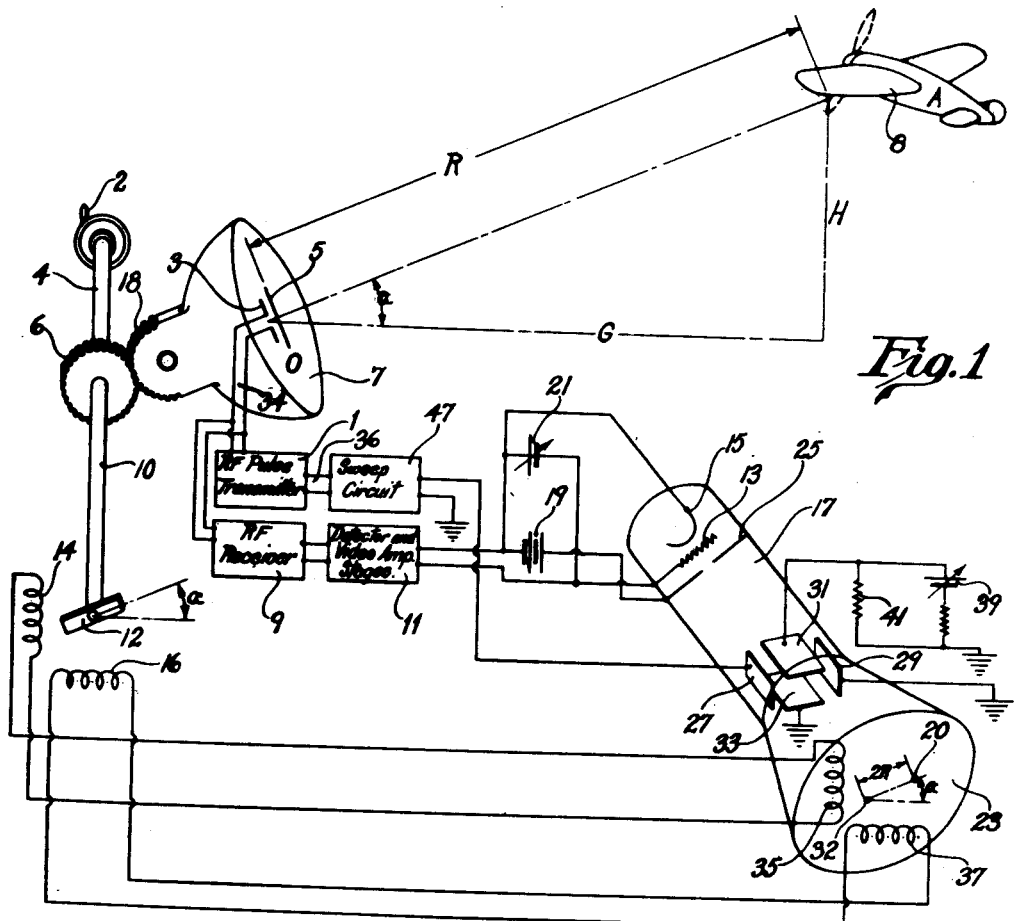
Inventor
Robert H. Rines
by David Rines
Attorney Jan. 6, 1953 R. H. RINES 2,624,874
ELECTRICAL APPARATUS FOR SOLVING RIGHT TRIANGLES
Filed Sept. 4, 1944 2 SHEETS—SHEET 2

Inventor
Robert H. Rines
by David Rines
Attorney

Patented Jan. 6, 1953

2,624,874

UNITED STATES PATENT OFFICE 2,624,874

ELECTRICAL APPARATUS FOR SOLVING RIGHT TRIANGLES

Robert Harvey Rines, Brookline, Mass.

Application September 4, 1944, Serial No. 552,705

6 Claims. (Cl. 343—11)

1

The present invention relates to electric systems, and more particularly to systems designed electrically to solve trigonometric problems.

It is frequently desirable, given the range and elevation of an aircraft, to determine its height and ground range. Many methods have been proposed for solving this problem, all of which are disadvantageous in one particular or another.

An object of the present invention, therefore, is, given an acute angle and the hypotenuse of a right triangle, electrically to determine the legs of the triangle.

Another object is to provide a novel system of electrically solving right triangles.

A further object is to provide a novel electrical height computer and ground-range computer.

Another object is to present the results of the computations on a cathode-ray-tube indicator.

Other and further objects will be explained hereinafter and will be particularly pointed out in the appended claims.

The invention will now be more fully explained in connection with the accompanying drawings, in which Fig. 1 is a diagrammatic view of circuits and apparatus illustrating a preferred embodiment of the invention designed for determining the height and the ground range of an airplane; Figs. 2, 3 and 4 are views illustrating various wave-forms associated with the apparatus, Fig. 2 illustrating transmitted radio-frequency pulses, Fig. 3 the output of the radio receiver, and Fig. 4 the output of the video stages; Fig. 5 is a detail view of the face of the cathode-ray-tube indicator shown in Fig. 1; Fig. 6 represents a wave form for triggering the sweep circuit; and Fig. 7 is a diagrammatic view of a preferred self-pulsing radio-transmitter.

Let it be assumed that an airplane 8 is positioned at A, at a distance R from a point of observation, or the detecting station, O, and that its elevation is the angle $\alpha$. The slant range R, constituting the hypotenuse, and the acuate angle $\alpha$ of the right triangle, may be observed, for example, by means of any well-known sound or radio-location equipment, based on the pulse principle. It is desired to learn the height H of the airplane and its ground range G, the two legs of the right triangle. This information may, of course, be readily obtained by means of trigonometric tables, or a slide rule, or by mechanical cams and other completely mechanical devices. There are advantages, however, in being able to read these values off accurately and directly on electrical equipment. There are particular advantages in being able to use a simple cathode-ray-tube indicator to do so.

This result may be attained, according to the present invention, as illustrated in Fig. 1, with the aid of a radio-location detector. The detector may comprise any well-known ultra-high-radio-frequency pulse transmitter 1, connected by conductors 34, to energize a dipole antenna 3 at the focus of a parabolic reflector 7. The pulsed radio energy may be, say, 50 centimeters wave-length. A parasitic reflector 5 may be employed to reflect the radiation from the dipole 3 back on to the parabolic reflector 7, which will then direct the energy out towards the airplane object 8. Upon hitting the object 8, the radio pulses become scattered and reflected back to the parabolic reflector 7 and to the dipole 3, and are received in the receiver 9. The receiver 9 may also directly pick up the strong transmitted pulses from the transmitter 1; in the period of quiescence of the transmitter 1, it also receives the echo from the airplane object 8.

The output of the radio-receiver 9 is detected and amplified as direct-current pulses in the detector and video stages 11. Suitable apparatus for performing this function may be found on page 749 of the "Radio Engineering" by F. E. Terman, 1937 edition. This video output is fed between the control grid 13 and the cathode 15 of a special cathode-ray-tube indicator 17. Normally, the electrode 13 is biased negatively with respect to the cathode 15 by, say, a battery 21, to prevent the electron stream from reaching the oscilloscope face 23 of the cathode-ray tube 17. A B-battery 19 constitutes a source of supply between the cathode 15 and the anode 25.

When the brightening pulses from the video stages 11, however, arrive between the grid 13 and the cathode 15, electrons emitted from the cathode 15 are permitted to be accelerated, in the form of a stream, past the control grid 13 and the anode 25 of the tube 17, between the two sets of horizontally and vertically disposed deflection plates 27, 29 and 31, 33, respectively, and, also, through horizontally and vertically disposed deflection coils 35 and 37, respectively, to impinge finally on the fluoresecent oscilloscope face 23. The plates 29 and 33 are shown grounded.

At the instant that the pulse transmitter 1 energizes the antenna 3, it also, by way of conductors 36, sends a triggering pulse to a sweep circuit 41 of any conventional, linear or near-linear type such, for example, as is illustrated on page 740 of the said "Radio Engineering," by F. E. Terman. This produces a linear or near-linear horizontal-sweep time base between the horizontal-deflection plates 27 and 29, for deflecting the electron stream horizontally. Since the control electrode 13 is biased negatively with respect to the cathode 15, however, this sweep, although the sweep voltage is in effect, will not be observable on the oscilloscope face 23. At such times as a pulse is received by the receiver 9, however, and is applied to lift the bias on the grid 13, by way of the detector and the video stages 11, a spot 20 does appear on the oscilloscope face 23, at a horizontal position corresponding to the value of the sweep voltage between the deflector plates 27 and 29 at that time. If it may be assumed, therefore, for the time being, that the sweep voltage starts a sweep at the center of the oscilloscope face 23 at the instant that a radio-frequency pulse is emitted towards the object 8, then, at the time that an echo pulse is received from the object 8 by the receiver 9, the spot 20 of electrons will appear on the oscilloscope face 23.

The echoes are indicated as a brief series of oscillations at 22 between similarly indicated received pulses 24 corresponding to similar oscillatory transmitted pulses 26. After rectification, and preferably also amplication, in the detector and video amplifier stages 11, the received pulses appear as shown at 28 and the echo as shown at 30, which serve as brightening pulses for the cathode-ray-tube. The spot 20 will appear at a point horizontally displaced from the center of the oscilloscope face 23 by a distance proportional to the slant range R of the object 8 from the antenna 3. The effective length of the time base is thus rendered proportional to the slant range R. The displacement of the spot 20 of electrons from the center of the oscilloscope face 23 will thus be a measure of the slant range R of the continuously tracked object 8 from the detecting station O. A grounded battery 39 produces a voltage across a resistor 41 to provide a vertical positioning control of the electron spot by a direct-current potential between the deflector plates 31 and 33.

The parts are so adjusted as to bring the initial point of impingement of the electron stream on the oscilloscope face 23, not at the center of the oscilloscope face 23, as before temporarily assumed, but off-center, as shown in Fig. 5. The major portion of the oscilloscope face 23 is thus made available for display purposes A handwheel 2 may be employed to rotate a gear 6 by means of a shaft 4, to elevate or depress the radio-location detector comprising the parabolic reflector 7. The gear 6 is shown meshing with a partly geared section 18 that is rigidly fixed to the parabolic reflector 7. The gearing 18 is such that the reflector 7 and the antenna 3 may be swung from the horizontal only to the zenith. The gear 6 may be fixed to a shaft 10 which, in turn, may rotate a magnetic-field-producing element 12. The parts may be so arranged that, when the parabolic reflector 7 is pointing horizontally, the magnetic-field-producing element 12 is also adjusted in a horizontal position. As the parabolic reflector is elevated to an angle $a$, therefore, the magnetic-field-producing element 12 also rotates through an angle $a$.

The magnetic-field-producing element 12 may constitute the rotor of a self-synchronous motor having a vertically positioned stator coil 14 and a horizontally positioned stator coil 16. Unlike many prior-art systems in which sweep-circuit voltages are applied to the time-base-positioning rotor, thereby varying the value of the magnetic field thereof at successive intervals of time in accordance with the sweep-circuit voltages, the present invention contemplates a rotor magnetic field unaffected by the sweep-circuit voltages, being thus produced at successive intervals of time in substantially the same or constant manner without regard to the instantaneous values of the sweep-circuit voltages. The rotor 12 is illustrated in Fig. 1 in the preferred simple form of a permanent magnet. Voltages will be induced in the coils 14 and 16 by the field of the magnet 12 as it is moved. As the magnet assumes an angle $a$ to the horizontal, the voltage in the coil 14 is proportional to $\sin a$, and the voltage in the coil 16 to $\cos a$. The extremities of the coil 14 are connected to the corresponding ends of a deflection coil 35 associated with the cathode-ray-tube 17, and the coil 16 is similarly connected to a deflection coil 37 of the tube 17. The deflection coils 35 and 37 will thus become energized in such a way that their fields will be identical with the fields of the respective coils 14 and 16; the field in coil 35 will be proportional to $\sin a$, and the field in coil 37 to $\cos a$.

Let it be assumed that the bias battery 21 is reduced, so that a sweep may be observed on the oscilloscope face 23. The time base will then position itself at an angle $a$ from the horizontal under the action of the voltages in the coils 35 and 37. If, for example, the parabolic reflector is pointing in the horizontal direction, $a=0$, the magnet 12 will induce a voltage in coil 16 only, and hence in coil 37 only. This in conjunction with an adjustment of the battery 39, will, say, cause the sweep to appear horizontal. If the parabolic reflector is elevated 90°, then the coil 14 will be solely energized, and hence the coil 35 will alone act on the time base as if it were another magnet or rotor, to cause it to appear vertically on the oscilloscope face.

For any angle of elevation or depression of the parabolic reflector 7, therefore, the time base will assume a corresponding angular orientation with respect to the horizontal on the oscilloscope face 23. Since the positioning voltage is independent of and unaffected by the sweep-circuit voltage, as before stated, variations in the accuracy of the latter cannot affect the former and the angular orientation of the time base will be always correct.

Since, as before explained, a brightening pulse is applied to the grid 13 of the cathode-ray-tube 17 at the moment when the echo is received from the object 8, the time base will brighten at such a point. Further, the distance from the start of the time base on the oscilloscope face to this bright spot is a measure of the slant range 2R of the object 8, indicating a range corresponding to a pulse traveling from the station O, a distance R to the object 8 and back a distance R to the station again. And the time base is elevated at an angle $a$ corresponding to the elevation of the parabolic reflector 7, or of the object 8 from the point of observation O. Since this time base corresponds to the hypotenuse of the right triangle, or the slant range 2R, the abscissa coordinate on the scope face of the brightened spot 20 on the time base is a measure of the ground range of the object 8 (proportional to $R \cos a$), and the ordinate coordinate is a measure of the height of the object (proportional to $R \sin a$).

An image of the right triangle, with its slant range 2R, its ground range 2G and its height 2H, will thus be electrically reproduced geometrically on the oscilloscope face 23.

A calibrated scale, which may be similar to that shown in Fig. 5, may be painted on the oscilloscope face. The horizontal and vertical units are double those corresponding to the slant range R in order to facilitate reading correctly the ground range G and the height H of any target appearing thereon. Radial calibration indicated by circles may also be employed to facilitate reading the slant range R. The outside boundary curve of the scale may also be circular. The transmitted pulse, because of delay in the system, appears as a bright spot 32 at the origin of coordinates, corresponding to the received, amplified and detected pulses 28. The echo 20 from the object will obviously be at a distance 2R from the transmitted pulse spot 32 at the origin of coordinates.

If the bias voltage of the battery 21 should be made so great that the time base shall not normally appear on the oscilloscope face 23, then only the spot 20 of electrons corresponding to the object 8 will show on the oscilloscope face 23. The ground and altitude coordinates and the slant range of the object 8 may be readily observed from the spot 20 visible on the oscilloscope face 23.

Any desired radio-frequency pulse transmitter may be employed for energizing the antenna 3, a preferred type being illustrated in Fig. 7. Two transmitting triodes 38 and 40 are connected in push-pull with their cathodes 42 and 44 connected together through a grounded tuned radio-frequency circuit 46. This tuned circuit may assume any desired form, such as a lecher line or a tuned cavity (not shown). The anodes 48 and 50 of the tubes 38 and 40 are shown connected together through a tuned circuit comprising a condenser 52 and a coil 54. The control electrodes 56 and 58 of the tubes 38 and 40 are connected together and through a condenser 60 to a ground 62. also through a resistor 64 to the grounded plate supply 66. A radio-frequency choke coil 67 is connected from the plate coil 54 to the plate supply 66 for the purpose of keeping radio frequency out of the supply.

In operation, some disturbance starts the tubes oscillating. The grids 56 and 58 draw electrons from their respective cathodes 42 and 44 to charge the condenser 60 negatively, thereby to stop conduction through the tubes, whereupon the oscillations cease. The condenser 60 thereupon discharges through the resistor 64 and the plate battery 66. When sufficient charge has leaked off the condenser 60, the oscillations recommence. The oscillating pulses 26 then produced in the coil 54 are picked up by a coil 68 for transmission by way of the conductors 34 to the dipole 3. To this end, one of the conductors 34 is connected to one terminal of the coil 68 and the other conductor 34 is connected to the other terminal.

A grounded center-tap 70 is connected to one of the conductors 36 and a rectifier 72 is connected through a coupling condenser 74 by a conductor 76 to the said other terminal of the pickup coil 68 and to the said other conductor 34.

The radio energy picked up by the coil 68, therefore, travels not only by way of the conductors 34 to the antenna 3, appearing as transmitted pulses 26, but also by way of the conductor 76 to the condenser 74 and the rectifier 72 and through a radio-frequency choke 78, to appear as direct-current pulses 82 across the resistor 80.

The terminals of the resistor 80 are connected to the conductor 36. The pulse 82 will obviously take place at the same time as the pulse 26.

The sweep circuit 47 is triggered, therefore, by way of the conductors 36 simultaneously with the pulse energization of the antenna 3. As described in the Terman volume previously mentioned, the pulses 82 may cause the sweep tube (not shown) of the sweep circuit 47 to discharge the sweep condenser (not shown), and the period of quiescence between the pulses 82 will allow the sweep condenser to charge, producing a near-linear sweep voltage between the deflector plates 27 and 29.

Because of the fact that the sweep starts, then, at the completion of the transmitted pulse 26, it might be inferred that the transmitted pulse spot 32 could not appear on the time base as shown in Fig. 5. Since these pulses 26 are not strictly sharp, however, some of the pulse does appear. The operability of the device, however, is uneffected by the appearance or non-appearance of this pulse on the screen.

Further modifications will occur to persons skilled in the art, and all such are considered to fall within the spirit and scope of the invention, as defined in the appended claims.

What is claimed is:

1. An electric system for finding the legs of a right triangle, given the hypotenuse and an acute angle, the said system having, in combination, a cathode-ray tube having a screen provided with a base line having an origin and a line disposed at right angles to the base line, the cathode-ray tube having means for producing an electron stream for impinging on the screen, means for causing the electron stream to impinge normally on the origin and two sets of deflecting means for respectively deflecting the electron stream in two directions at right angles to each other, means connected with the deflecting means for deflecting the electron stream to trace on the screen a hypotenuse line extending from the origin along the base line, means comprising a rotor of substantially constant magnetic field angularly adjustable to the said acute angle and a stator, and means connected to the deflecting means and controlled in accordance with the field produced in the stator by the angular movement of the rotor for positioning the hypotenuse line at an acute angle to the base line equal to the acute angle with the length of the hypotenuse line proportional to the length of the hypotenuse, the base line and the line at right angles to the base line being calibrated in units proportional to the units of the hypotenuse line.

2. An electric system for finding the ground range and the height of an elevated distant object having, in combination, a detector angularly adjustable vertically to an angle corresponding to the angle of elevation of the object in order that it may receive a signal from the object, a self-synchronous motor having a rotor of substantially constant magnetic field and a stator, means controlled in accordance with the angular adjustment of the detector for varying the field of the stator in accordance with the position of the rotor, a cathode-ray tube having a screen provided with a reference line and a reference point, the cathode-ray tube having means for producing an electron stream for impinging on the screen, and means controlled in accordance with the received signal for causing the electron stream to produce on the screen a time base extending from the reference point of length proportional to the slant range of the object and controlled in accordance with a field corresponding to the field produced in the stator by the movement of the rotor to position the time base at an angle to the reference line corresponding to the instantaneous angular adjustment of the detector.

3. An electric system for finding the ground range and the height of an elevated distant object having, in combination, a detector angularly adjustable vertically to an angle corresponding to the angle of elevation of the object in order that it may receive a signal from the object, a self-synchronous motor having a rotor of substantially constant magnetic field and a stator, means controlled in accordance with the angular adjustment of the detector for varying the field of the stator in accordance with the position of the rotor, a cathode-ray tube having a screen provided with a base line having an origin and a line disposed at right angles to the base line, the cathode-ray tube having means for producing an electron stream for impinging on the screen and means for causing the electron stream to impinge normally on the origin, the cathode-ray tube having also means for deflecting the electron stream to cause the electron stream to trace on the screen a time base extending from the origin, means connected to the detector for causing the effective length of the time base to be made proportional to the slant range of the object, and means for energizing the deflecting means with a field corresponding to the field produced in the stator by the movement of the rotor to position the time base at an angle with the base line corresponding to the instantaneous angular adjustment of the detector, the base line and the line at right angles to the base line being calibrated in units proportional to the units of the time base.

4. An electric system for finding the ground range and the height of an elevated distant object having, in combination, a detector angularly adjustable vertically to, but not beyond, the zenith to an angle corresponding to the angle of elevation of the object in order that it may receive a signal from the object, a self-synchronous motor having a rotor of substantially constant magnetic field and a stator, means controlled in accordance with the angular adjustment of the detector for varying the field of the stator in accordance with the position of the rotor, a cathode-ray tube having a screen provided with a base line having an origin, means for producing an electron stream impinging on the screen and mean for causing the electron stream to impinge normally on the origin, the cathode-ray tube having also means for deflecting the electron stream to trace on the screen a time base extending from the origin, means connected to the detector for causing the effective length of the time base to be made proportional to the slant range of the object, means for energizing the deflecting means with a field corresponding to the field produced in the stator by the movement of the rotor to position the time base at an angle with the base line corresponding to the instantaneous angular adjustment of the detector, and means connected to the deflecting means for off-setting the origin of the time base in order that the time base shall be disposed on the major portion of the screen corresponding to all angles of elevation up to the zenith.

5. An electric system for finding the ground range and the height of an elevated distant object having, in combination, a radio transmitter for transmitting pulses of radio waves to the object, a radio receiver, the transmitter and the receiver having common directive antenna means for directing and receiving, respectively, radio waves and the same transmitted radio waves after scattering or reflection from the object, means for converting part of the energy of the transmitted radio waves into triggering pulses corresponding to the transmitted radio pulses, the antenna means being angularly adjustable to an angle corresponding to the angle of elevation of the object in order that it may receive the scattered or reflected radio waves, a self-synchronous motor having a rotor of substantially constant magnetic field and a stator, means controlled in accordance with the angular adjustment of the antenna means for varying the field of the stator in accordance with the position of the rotor, means triggered by the triggering pulses for producing a time base, means responsive to the scattered or reflected radio waves received by the receiver for causing the effective length of the time base to be made proportional to the slant range of the object, and means controlled in accordance with the field produced in the stator by the movement of the rotor to position the time base at an angle corresponding to the instantaneous angular adjustment of the detector.

6. An electric system for finding the ground range and the height of an elevated distant object having, in combination, a radio transmitter for transmitting pulses of radio waves to the object, a radio receiver, the transmitter and the receiver having common directive antenna means for directing and receiving, respectively, radio waves and the same radio waves after scattering or reflection from the object, means for converting part of the energy of the transmitted radio waves into triggering pulses corresponding to the transmitted radio pulses, the antenna means being angularly adjustable to an angle corresponding to the angle of elevation of the object in order that it may receive the scattered or reflected radio waves, a self-synchronous motor having a rotor of substantially constant magnetic field and a stator, means controlled in accordance with the angular adjustment of the antenna means for varying the field of the stator in accordance with the position of the rotor, a cathode-ray tube having a screen provided with a base line having an origin, means for producing an electron stream impinging on the screen and means for causing the electron stream to impinge normally on the origin, means triggered by the said triggering pulses and connected to the deflecting means for deflecting the electron stream to trace on the screen a time base extending from the origin, means responsive to the received scattered or reflected radio waves received by the receiver for causing the effective length of the time base to be made proportional to the slant range of the object, and means for energizing the deflecting means with a field corresponding to the field produced in the stator by the movement of the rotor to position the time base at an angle to the base line corresponding to the instantaneous angular adjustment of the detector.

ROBERT HARVEY RINES.

(References on following page)

REFERENCES CITED

The following references are of record in the file of this patent:

UNITED STATES PATENTS

| Number | Name | Date |
|---|---|---|
| 2,151,917 | Hyland | Mar. 28, 1939 |
| 2,400,791 | Tolson | May 21, 1946 |
| 2,405,231 | Newhouse | Aug. 6, 1946 |
| 2,409,456 | Tolson et al. | Oct. 15, 1946 |
| 2,412,631 | Rice | Dec. 17, 1946 |
| 2,426,189 | Espenschied | Aug. 26, 1947 |
| 2,430,292 | Hershberger | Nov. 4, 1947 |
| 2,437,286 | Witt | Mar. 9, 1948 |
| 2,519,397 | Ranger | Aug. 22, 1950 |

FOREIGN PATENTS

| Number | Country | Date |
|---|---|---|
| 520,778 | Great Britain | May 3, 1940 |
| 543,638 | Great Britain | Mar. 5, 1942 |